July 12, 1949.  P. W. GARBO  2,475,607
FLUIDIZATION IN ZINC PRODUCTION
Filed Aug. 26, 1947
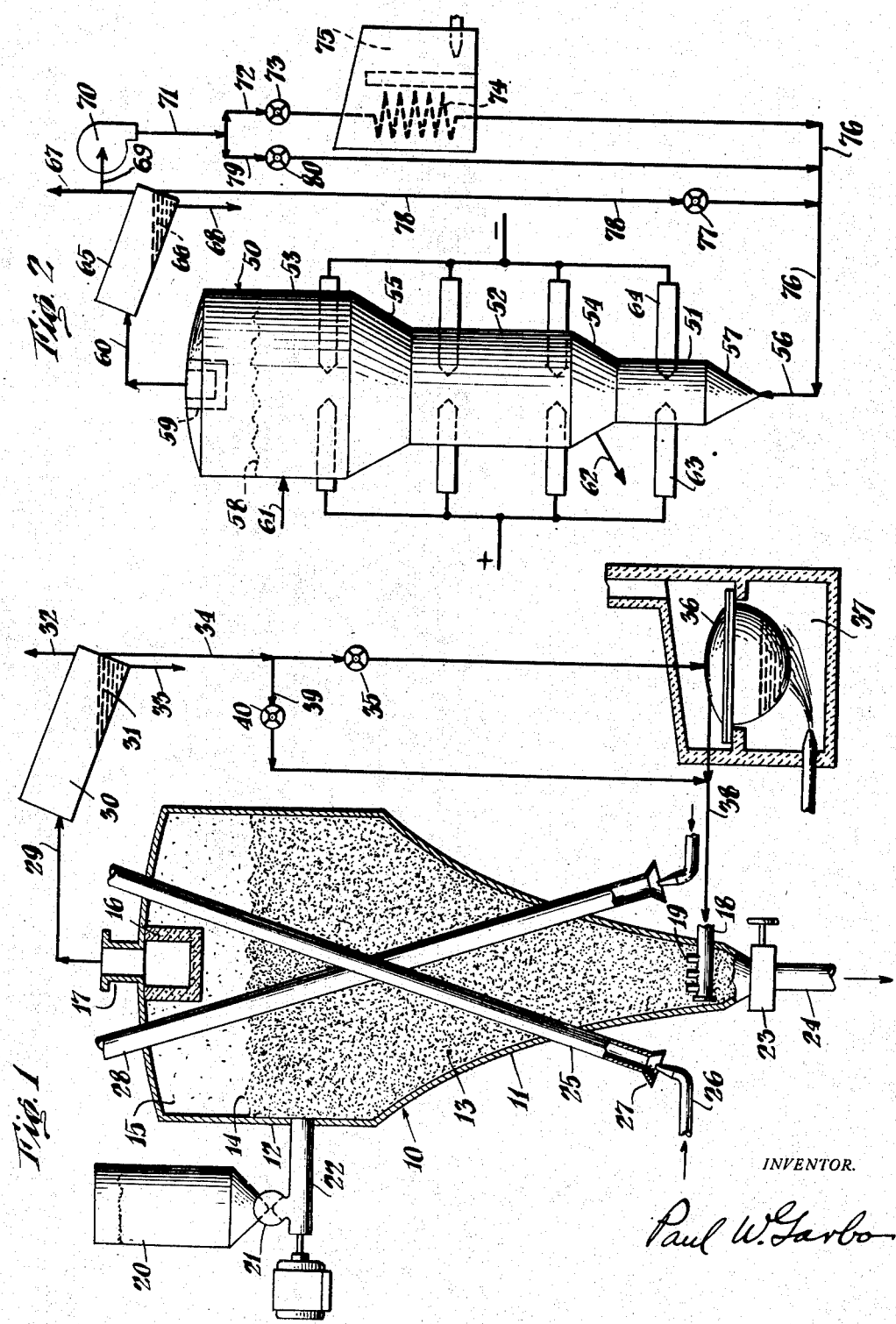
INVENTOR.
Paul W. Garbo Patented July 12, 1949

2,475,607

UNITED STATES PATENT OFFICE 2,475,607

FLUIDIZATION IN ZINC PRODUCTION

Paul W. Garbo, Freeport, N. Y., assignor to The American Metal Company, Limited, New York, N. Y., a corporation of New York Application August 26, 1947, Serial No. 770,590

14 Claims. (Cl. 75—26)

This invention pertains to the reduction of zinc compounds under fluidizing conditions.

Fluidization is the phenomenon which occurs when a gasiform medium is passed up through a mass of finely divided solids at such a velocity that the solid particles become suspended and yet exhibit slippage or "hindered settling" in the upward flowing gaseous stream. Under such circumstances, the bed or mass of solids takes on the appearance of an ebullient liquid, the individual particles of the bed being in continuous random movement therethroughout.

While the fluidizing technique has been applied on a commercial scale principally to the catalytic cracking of petroleum fractions, the technical literature contains several suggestions for the use of this technique in other process industries. Two recent patents propose methods for reducing zinc oxide in a fluidized state. However, these proposals are commercially unattractive because, among other reasons, they depend on the introduction into the fluidizing reducer of a relatively large volume of fluidizing gas such as hydrogen or carbon monoxide which markedly decreases the concentration of zinc vapor in the reaction gases leaving the reducer. Thus, not only is the recovery of the zinc by condensation rendered more difficult but also the tendency to form undesirable blue powder (superficially oxidized zinc) is increased. In addition, the equipment must be made larger to handle the required volume of fluidizing gas and this, in turn, augments the heat losses because there is more apparatus surface radiating heat outwardly and because the fluidizing gas passing through the reducer leaves at the elevated temperature, say 1850° F., maintained therein. It is clear, therefore, that the problem of supplying the large heat requirements of the reduction reaction is made more acute by these heat losses.

A principal object of my invention is to conduct the reduction of zinc compounds under fluidizing conditions without using a fluidizing medium which dilutes the zinc vapor content of the reaction gases.

Another object is to minimize the difficulties of maintaining the reducing zone at the desired elevated temperature.

Still another object is to combine the reworking of blue powder or similar waste zinc particles with the maintenance of good fluidizing conditions in the reduction of finely divided zinc oxide or like reducible zinc compound.

Further objects of the invention will be evident in the description which follows.

Broadly, the invention involves the use of a gasiform stream comprising zinc in vapor or particle form as the fluidizing medium for the reduction of comminuted zinc compounds under fluidizing conditions; preferably, zinc vapor alone is introduced into the bottom of the reducing vessel to support fluidization therein. However, inasmuch as the reaction gases leaving the reducer contain zinc vapor and carbon monoxide as the principal components in approximately equal volume proportions, it is feasible to divert a portion of these reaction gases for recirculation as fluidizing medium to the bottom of the reducing reactor; in such case, the carbon monoxide content of the gaseous stream entering the bottom of the reactor has substantially no diluting effect on the zinc vapor content of the gaseous effluent from the reactor. In any event, the fluidizing stream entering the reducer should contain not less than 40% by volume of zinc, calculated on the assumption that the zinc is in vapor form.

As is known, the recovery of zinc by condensation of the vapor contained in the gaseous effluent from a zinc reducer of any type is frequently attended by the formation of some blue powder. Zinc plants also have several other wastes consisting essentially of zinc in particle form, for instance, drosses formed in casting operations. All such zinc wastes are generally reworked to recover their zinc content in a useful form. The present invention contemplates the utilization of blue powder and like zinc wastes as a component of the fluidizing medium charged to the bottom of a fluidizing reducer for the production of zinc. As an example, blue powder may be suspended in a stream of carbon monoxide injected as fluidizing medium into the bottom of a fluidizing reactor. On entering the fluidized mass maintained at the elevated temperature required for the reduction, the zinc in the blue powder particles is promptly vaporized and the resulting vapor aids in fluidizing the lower portion of the reacting mass. Simultaneously, the oxidized portions of the blue powder are reduced and thus yield additional zinc vapor. The proportion of blue powder added to the carbon monoxide is such that the composite stream used as the fluidizing medium contains not less than 40% by volume of zinc, calculated on the assumption that all of the unoxidized zinc present in the composite stream is in vapor form.

In accordance with the preferred form of the invention, the reaction gases leaving the zinc reducer are subjected to treatment, usually conventional condensation, to separate zinc vapor from the uncondensable gases, predominantly carbon monoxide. A portion of the separated zinc is vaporized and preferably superheated, in which condition it is charged into the bottom of the reducer to support fluidization therein. To the extent that the zinc vapor is superheated to a temperature above the temperature maintained in the fluidized reaction mass, the supply of heat by heat transfer surfaces, electric arcs and the like to maintain the desired reaction temperature is diminished and, accordingly, the problem of meeting the heat requirements of the reaction system is simplified. It is also possible to superheat liquid zinc and to inject the superheated liquid into the bottom portion of the reducer wherein flash vaporization of the zinc will occur and the resulting vapor will act as the fluidizing medium.

To facilitate clearer understanding of the invention, illustrative embodiments thereof will be described in conjunction with the accompanying drawings, of which:

Figure 1 is a schematic sectional elevation of apparatus in which one form of the process of the invention may be carried out; and Figure 2 is a similar view of apparatus suitable for the operation of another form of the invention.

Referring to Figure 1, a reducing vessel 10 comprising a lower flared section 11 and an upper straight section 12 contains a fluidized bed 13 having an upper pseudo-liquid level 14. In operation, the reaction gases passing through vessel 10 emerge from the fluidized mass 13 in the region of pseudo-liquid level 14 and ascend through space 15 wherein particles entrained by the gases tend to settle out. Filter element 16 is interposed between the settling space 15 and outlet 17 so that the reaction gases may be withdrawn free of suspended particles. To support fluidization, particularly in the lower portion of the bed 13, zinc vapor is introduced through pipe 18 and nozzles 19. A mixture of finely divided zinc compound and a solid reducing agent such as pulverized coke is fed from hopper 20 by way of feeder 21 and screw conveyor 22 into the upper portion of the fluidized bed 13. The reducer 10 is provided at its lower extremity with a slide valve 23 through which reacted solids are withdrawn by way of pipe 24.

To maintain the fluidized mass 13 at the desired reducing temperature, a plurality of firetubes 25, uniformly distributed around the vessel 10 and passing obliquely therethrough to expose a greater length of heat surface, are charged with a fluid fuel such as natural gas or fuel oil through injectors 26 which cooperate with Venturi-like openings 27 for the aspiration of air to support combustion within the tubes 25. The combustion or flue gases leave these tubes through the upper ends 28, discharging into the atmosphere or a suitable stack.

The reaction gases leaving reducer 10 by way of outlet 17 are conducted by line 29 to a condenser 30. A pool 31 of molten zinc collects at the bottom of condenser 30 and the residual gas, predominantly carbon monoxide, is withdrawn from condenser 30 by way of line 32. A quantity of molten zinc corresponding to the productive capacity of reducer 10 is withdrawn through line 33 and sent to storage or refining facilities, as desired. Molten zinc also flows from pool 31 through line 34 which is provided with a valve 35 to regulate the quantity of zinc which is employed to support fluidization in the lower portion of reducer 10. The molten zinc flowing through line 34 and valve 35 enters vaporizing pot 36 within the furnace 37. Vaporized zinc passes from pot 36 to pipe 18 by way of line 38. In cases where the reducer 10 is provided with adequate heating surface to maintain the fluidized mass 13 at reaction temperature, the molten zinc flowing through line 34 may be sent directly to the bottom of reducer 10. In such instance, the molten zinc would follow the alternative path provided by branch line 39 which connects line 34 with line 38 discharging into reducer 10 by way of pipe 18 and nozzles 19, valve 40 being open and valve 35 closed. The molten zinc on contacting the fluidized mass 13 is vaporized and the resulting vapor supports fluidization at the base of reducer 10.

In Figure 2 the reducing vessel 50 made up of a plurality of cylindrical sections 51, 52 and 53 of increasing horizontal cross-section in the upward direction, connected by frusto-conical sections 54 and 55, is supplied with a fluidizing medium by pipe 56 attached to the conical base 57 or reactor 50. The fluidized mass undergoing reduction has an upper pseudo-liquid level 58 defining the region where the reaction gases become separated from the bulk of the solids. The reaction gases then pass through filter 59 to eliminate entrained particles and discharge through line 60. In operation, a finely-divided mixture of a zinc compound and carbon enters vessel 50 through line 61 and the reacted solids are withdrawn through line 62. The thermal requirements of the endothermic reduction are met by two sets of electrodes 63 and 64 projecting into the fluidized mass and connected to a source of electrical power; the passage of electric current from one set of electrodes to the other generates heat within the fluidized bed. The reaction gases flow from line 60 into condenser 65, a pool 66 of molten zinc collecting at the bottom thereof and residual gases leaving by way of line 67. A quantity of zinc corresponding to the productive capacity of the reaction system is drawn off through line 68. Part of the residual gases in line 67 are diverted into branch line 69 and forced by blower 70 into line 71 which ultimately discharges into reactor 50 by way of either of two alternate paths. The residual gases may pass through line 72 and valve 73 to tubular heater 74 in furnace 75 and thence to line 76. By regulating valve 77, molten zinc flows from condenser 65 through line 78 into line 76 through which the zinc is swept in atomized form by the heated gases. The gases and entrained zinc pass from line 76 to line 56 which discharges into the conical base 57 of vessel 50. Alternatively, the gases in line 71 may be introduced into line 76 without preheating by closing valve 73 and opening valve 80 in line 79. In either case, the zinc and residual gases flowing through lines 76 and 56 into reducer 50 are so proportioned that the composite stream of fluidizing medium has at least the same zinc content as that of the gaseous stream leaving reducer 50 by way of line 60. It is advisable that the composite stream contain not less than 40% by volume of zinc, assuming it to be in vapor form.

In view of the rapid strides that are being made in metallurgy, it is expected that in the not too distant future metals suitable for the construction of blowers or turbines operating at temperatures up to 2000° F. will become available. With such a material of construction at hand, line 69 would be connected directly to line 60 and thus the reaction gases recycled to reactor 50 as fluidizing medium would flow without separation of zinc therefrom either through tubular heater 74 or through line 79 to line 76. Line 78 would not be required except that it might be used to increase the zinc content of the fluidizing medium over that which naturally obtains in the reaction gases passing through line 60.

A specific example of the process of the invention will be given in terms of a reactor of the type shown in Figure 1. The vessel 10 is 2.3 feet in diameter at the point where zinc vapor is fed through pipe 18 and nozzles 19 and is 9.3 feet in diameter within the straight section 12. The fluidized mass 13 is 34 feet in depth. Fifty firetubes 25 of 4-inch diameter are uniformly spaced around the axis of vessel 10 in a four-ring arrangement. Natural gas is burned with air within tubes 45 to maintain the fluidized mass 13 at a reaction temperature of 1840° F. A mixture of impure zinc oxide (weight analysis of ZnO 78.5%, ZnS 1.5%, $ZnSO_4$ 2.2%, $Fe_2O_3$ 10.0%, PbO 2.8% and the remainder comprising the oxides of copper, cadmium, manganese, magnesium, calcium and silicon) and coke in the proportions of 3 lbs. of impure zinc oxide per pound of coke and in the form of a powder passing through a 60-mesh screen (40% thereof passing through a 325-mesh screen) enters the reducing zone by way of screw conveyor 22 at the rate of 4295 lbs. per hour. Under the selected reaction conditions and with the increase of horizontal cross-section in vessel 10, an average gas velocity of about 0.5 foot per second is established. With the introduction of 292 lbs. per hour of zinc as vapor through pipe 18, the reaction gases discharging from outlet 17 contain 48.2% by volume of zinc vapor. Molten zinc withdrawn from condenser 30 by way of line 33 amounts to 2000 lbs. per hour. A small quantity (about 292 lbs. per hour) of zinc is admitted through valve 35 into pot 36 to generate the zinc vapor discharging from nozzles 19 into the fluidized mass 13. The zinc vapor thus recycled to the reducer 10 is at a temperature approaching 2000° F. and acts as the fluidizing medium in the bottom portion of the bed 13.

If the foregoing operation were modified only in respect to using the same number of mols of carbon monoxide as the recycled zinc to act as the fluidizing medium, the gaseous reaction products discharging through outlet 17 would then contain only 42% by volume of zinc vapor.

Those skilled in the production of zinc will appreciate that some blue powder is usually formed in condensing the zinc vapor contained in the gaseous effluent from the reducing vessel. This blue powder which tends to collect and float on the surface of the molten zinc in the condenser is skimmed off and returned to the reducing vessel for reworking. The present invention may utilize blue powder or like zinc wastes in particle form as at least a portion of the stream charged into the bottom of a reducing vessel to support fluidization therein and simultaneously to rework the blue powder or other waste zinc. In this connection it is well to note that line 34 of Figure 1 and line 78 of Figure 2 are connected to condensers 30 and 65, respectively, to draw zinc from the surfaces of the molten pools in these condensers. By such an arrangement any blue powder floating on the molten zinc can be carried into the recycle line so that the blue powder is returned to the reducing vessel where fluidization is promoted and the oxidized surface of the zinc particles is reduced.

In the specific example of the process of my invention presented hereinbefore, in place of 292 lbs. of zinc which is hourly injected in vapor form into the bottom portion of the fluidized mass, I may use each hour 155 lbs. of blue powder (comprising 146 lbs. of unoxidized zinc) suspended in 800 cubic feet of carbon monoxide. In this case, the gaseous effluent from the reducing zone will contain 45.1% by volume of zinc vapor which value is intermediate the value of 48.2% attained when zinc vapor alone is the fluidizing medium and the value of 42% when carbon monoxide is the sole fluidizing medium.

The advantages of conducting the reduction of a comminuted zinc compound in a fluidized bed of which at least the lower portion is of increasing horizontal cross-section in the upward direction are fully brought out in the copending application of John C. Kalbach, Serial No. 759,545, filed July 8, 1947. In another copending application of John C. Kalbach, Serial No. 767,548, filed August 8, 1947, it is disclosed that further advantages are realized when the fluidizing reduction of a comminuted zinc compound is carried out in two or more stages. Stagewise fluidization may be effected by disposing the fluidized mass in two or more reducing vessels connected in series or by dividing a single vessel with one or more grids to form contiguous stages within the fluidized bed of that vessel. Thus, a grid or a perforated plate may be placed horizontally across the reactor 10 of Figure 1 at the level where the flared section 11 merges with cylindrical section 12; the portion of the fluidized bed 13 below the grid or perforated plate then becomes the first reducing stage and the portion above the grid or perforated plate becomes the second reducing stage. The feature of the present invention, namely, charging a fluidizing medium which is rich in zinc into the lowermost portion of a fluidized bed, is also applicable to the stagewise fluidizing reduction of zinc compounds.

In general, it is advisable that the comminuted zinc compound, notably impure zinc oxide obtained by roasting a sulfide type of zinc ore, be supplied to the reducing zone in the form of particles all of which pass through a 60-mesh screen and 20% to 40% of which pass through a 325-mesh screen. The carbon or solid reducing agent, such as coal, charcoal or coke, is usually supplied to the reducer in the form of particles somewhat coarser than the zinc compound particles because of the lower specific density of carbon and consequent tendency of these carbon particles to become fluidized at a gas velocity which will fluidize the finer but denser particles of zinc compound. The average gas velocity through the reducing zone will usually be in the range of about 0.2 to 2.0 feet per second, preferably about 0.4 to 1.5 feet per second. However, all of the foregoing factors may have values larger or smaller than the indicated advantageous ranges, as will be obvious to those skilled in the art.

Satisfactory temperatures for reducing zinc compounds by the process of this invention fall in the range of 1600° to 2300° F., preferably in the range of 1800° to 2000° F.

Since certain changes may be made in carrying out the process hereinabove described without departing from the scope and spirit of the invention, it is intended that all matter contained herein

What I claim is:

1. In the process of reducing a comminuted inorganic oxygen containing zinc compound while maintained in a fluidized state, the improvement which comprises recycling a portion of the zinc-containing products emerging from the fluidized mass undergoing reduction to said fluidized mass to promote fluidization.

2. The process of claim 1 wherein the recycled portion of the zinc-containing products is heated before entering the fluidized mass.

3. In the process of reducing a comminuted inorganic oxygen-containing zinc compound while maintained in a fluidized state, the improvement which comprises separating zinc from the gasiform products emerging from the fluidized mass undergoing reduction, and recycling separated zinc to said fluidized mass to promote fluidization.

4. The process of claim 3 wherein the recycled zinc is in vapor form before entering the fluidized mass.

5. The process of reducing a comminuted inorganic oxygen-containing zinc compound under fluidizing conditions, which comprises maintaining the fluidized mass undergoing reduction as a bed of increasing horizontal cross-section in the upward direction, withdrawing zinc-containing gasiform products from said mass, and recycling a portion of the withdrawn products to the bottom of said mass to promote fluidization.

6. The process of claim 5 wherein the recycled portion of said products is heated before entering the bottom of said mass.

7. The process of claim 5 wherein the zinc-containing gasiform products withdrawn from said mass contain at least about 40% by volume of zinc vapor.

8. The process of reducing a comminuted inorganic oxygen-containing zinc compound under fluidizing conditions, which comprises maintaining the fluidized mass undergoing reduction as a bed of increasing horizontal cross-section in the upward direction, withdrawing zinc-containing gasiform products from said mass, separating zinc from said gasiform products, and recycling separated zinc to the bottom of said mass to promote fluidization.

9. The process of claim 8 wherein the recycled zinc is in vapor form before entering the bottom of said mass.

10. The process of recovering zinc from a comminuted material comprising zinc oxide, which comprises subjecting said comminuted material while in a fluidized state to reducing conditions, employing a fluidizing medium containing at least about 40% of zinc on the gas volume basis, and recovering zinc from the gasiform products of reduction.

11. The process of claim 10 wherein the zinc contained in said fluidizing medium is predominantly in the form of blue powder.

12. In the production of zinc by the fluidizing process involving the reduction of a solid inorganic oxygen-containing compound of zinc by a solid carbonaceous reducing agent, both said solids being in comminuted form, wherein a gaseous effluent containing the zinc vapor generated by said reduction is withdrawn from the top of the reduction zone, the improvement which comprises returning a portion of said gaseous effluent to the bottom of said reduction zone to fluidize the reacting solids in said reaction zone.

13. The process of claim 12 wherein the gaseous effluent contains at least about 40% of zinc on the gas volume basis.

14. In the production of zinc by the fluidizing process involving the reduction of a solid inorganic oxygen-containing compound of zinc by a solid carbonaceous reducing agent, both said solids being in comminuted form, wherein a gaseous effluent containing the zinc vapor generated by said reduction is withdrawn from the reduction zone, the improvement which comprises condensing the zinc vapor of the withdrawn gaseous effluent and utilizing a portion of the condensed zinc as fluidizing medium in said reduction zone.

PAUL W. GARBO.

REFERENCES CITED

The following references are of record in the file of this patent:

UNITED STATES PATENTS

| Number | Name | Date |
| --- | --- | --- |
| 2,342,368 | Queneau | Feb. 22, 1944 |
| 2,385,216 | Marancik et al. | Sept. 18, 1945 |
| 2,393,704 | Ogorzaly | Jan. 29, 1946 |
| 2,430,389 | Chubb | Nov. 4, 1947 |
| 2,431,630 | Arveson | Nov. 25, 1947 |